UNITED STATES PATENT OFFICE.

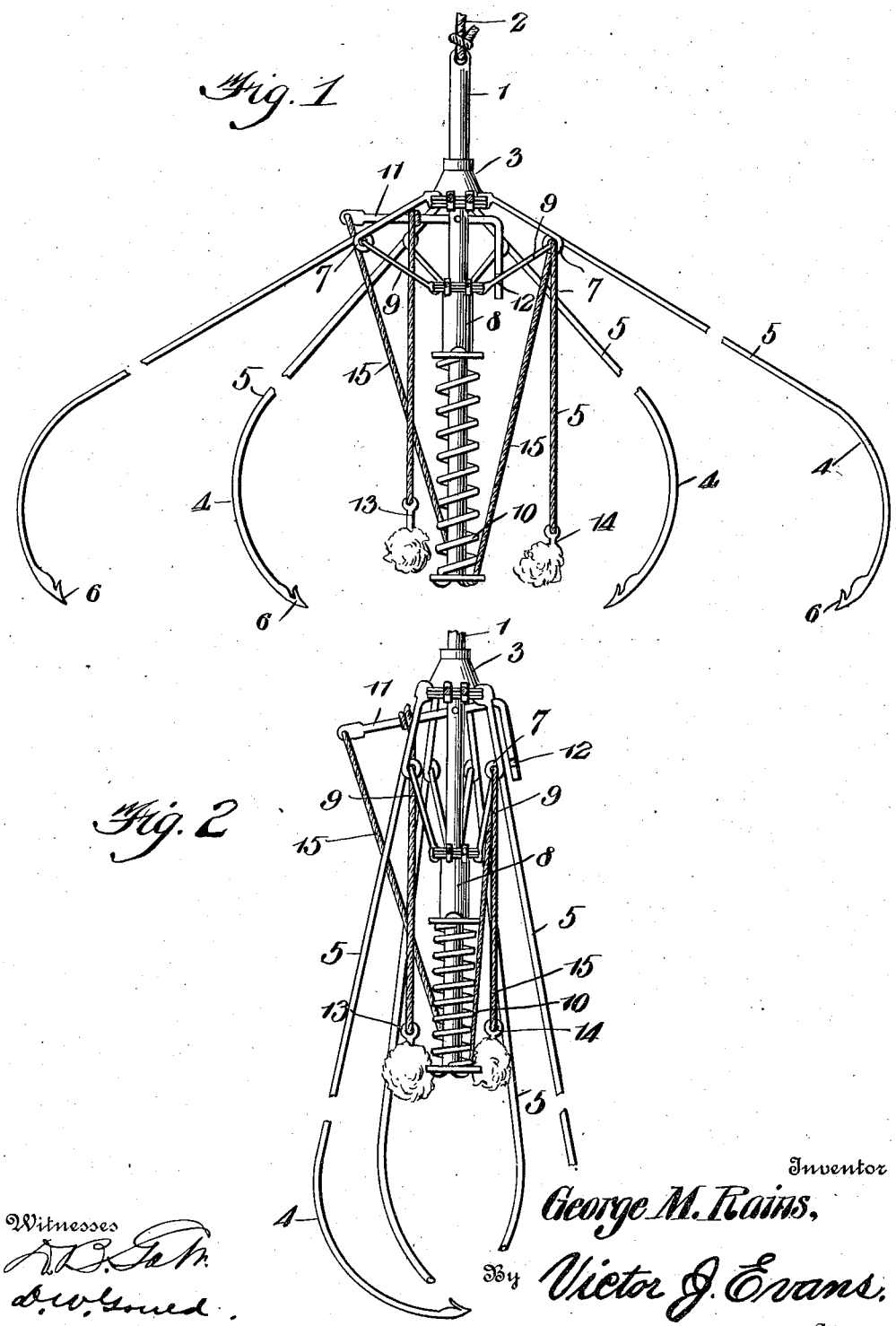

GEORGE M. RAINS, OF GROSVENOR, TEXAS.

TRAPPING DEVICE.

1,014,516.   Specification of Letters Patent.   Patented Jan. 9, 1912.

Application filed September 9, 1910. Serial No. 581,190.

*To all whom it may concern:*

Be it known that I, GEORGE M. RAINS, a citizen of the United States, residing at Grosvenor, in the county of Brown and State of Texas, have invented new and useful Improvements in Trapping Devices, of which the following is a specification.

The invention relates to an improved trapping device designed particularly for use in fishing, and comprehending essentially a series of grab hooks adapted, when the device is set, to be held against the closing tension of a spring, the latter being released to operate the grab hooks upon the actuation of a trip operated by the fish or the like taking the bait.

The main object of the present invention is the provision of a fish trapping device including a main stem and carrying a series of grab hooks and a spring operated runner connected to said grab hook and designed, under the free influence of the spring, to force said hook into closed or operative position, the construction providing a trip or trigger normally operative when set to hold the grab hook extended against the action of the spring, the trigger serving as a bait carrying means to permit operation of the trigger through a fish taking the bait.

The invention in its preferred details of construction will be described in the following specification, reference being had particularly to the accompanying drawings, in which:—

Figure 1 is a perspective view of the improved trap set for operation. Fig. 2 is a similar view with the parts in closed or operative position.

Referring particularly to the accompanying drawings, the improved trap comprises a main stem 1 preferably of hollow construction for lightness and formed at one end to permit the ready application of a fish line 2, as shown. Below the upper end said stem is provided with an attaching member or sleeve 3 corresponding to the usual umbrella notch, in which is secured, in a manner similar to the attachment of the ribs to the umbrella notch, a series of grab hooks 4. These hooks are identical in construction and comprise a suitable length of shank 5 formed at the upper end with an eye for the securing wire of the notch and at the lower end with a hook terminal 6 which may be of any usual or preferred construction. At a point adjacent the upper ends the shank 5 of the grab hooks are formed with eyes 7, preferably by providing a turn in the shank as shown.

Slidably mounted upon the main stem 1 is what may be termed a runner 8, similar to the runner used in umbrella construction, and formed at the upper end to provide for the pivotal connection therewith of a link 9, the outer ends of which engage in the eyes 7 of the grab hooks. From this construction it will be obvious that as the runner is moved upwardly the grab hooks will be extended to space their hook terminals the maximum distance apart, and as the runner moves downwardly the hook terminals of the grab hooks are brought together in overlapped relation immediately beneath and in alinement with the main stem, as shown in Fig. 2. A coil spring 10 encircles the stem 1 being terminally secured to the lower end of the stem and to the lower end of the runner. The spring is tensioned to normally maintain the runner in its lowermost position, that is with the grab hooks in extended operative relation.

Pivotally secured in a slot in the stem 1 between the runner and notch is a trip or trigger 11 having one end beyond the stem projected at right angles and extending downwardly, being formed adjacent its lower end with a notch 12 to engage one of the links 9. The outer or free end of the trigger is connected by a suitable flexible connection with a bait carrying hook 13, and if desired similar hooks may be connected to each of the grab hooks. I have illustrated the connection of one such hook 14, through the medium of a flexible connector, as 15, which extends upwardly through the eye 7 of the grab hook and then downwardly through a swivel or eye at the lower end of the main stem 1 and then upwardly and terminally connected to the trigger, so that the pull upon said bait hook will release the trigger.

The device is set by moving the runner upwardly on the main stem and causing the trigger notch to engage the adjacent link, whereby the parts are held in such set position against the tension of the spring 10. Normally the notch 12 of the depending end of the trigger 11 is adapted to engage the link 9 in such a way that the grab hooks will be held in extended positions and when the pull of the spring 10 upon the trigger is supplemented by the pull of a fish upon the bait hook the depending end or arm of the trigger will be disengaged from the link, consequently permitting the spring to retract and the grab hooks to bite into the head of the fish. The link 9 is in a different radial plane from the depending arm of the trigger 11, so that when the trigger 11 is actuated the notch 12 will be moved away from the link 9 so as to disengage the trigger from said link. In the effort of the fish to remove the bait from the bait hooks, the trigger will be moved thereby releasing the particular link and permitting the spring to force the hook terminals of the grab hooks into closed position, thereby trapping the fish.

It is to be understood that the improvement, while particularly designed as a fishing device, is equally serviceable for trapping animals or the like which may be attracted by bait suspended from the bait hooks.

The device may be constructed of any desired material and in any size appropriate to the use for which it may be designed.

Having thus described the invention, what I claim as new is:—

1. In a trapping device, a stem, a plurality of grab hooks pivoted at their upper ends to the stem and provided with inwardly curved lower ends, a runner slidable on the stem, links connecting the runner to the upper portions of the grab hooks, a spring for moving the runner on the stem, a trigger pivoted to the stem and provided with a depending arm having a notch to engage one of the links and a bait hook connected with the trigger.

2. In a trapping device, a stem having a sleeve secured thereon, a plurality of curved grab hooks pivoted at their upper ends to the sleeve, a runner slidable on the stem, a plurality of links pivoted to said runner and to the grab hooks, a spring mounted on said stem and connected with the runner to move said runner on the stem, a trigger pivoted to the stem between the runner and the sleeve and provided with a depending arm having a notch to engage one of the links and a bait hook connected with the trigger.

3. In a trapping device, a stem having a stop at one end thereof, a sleeve secured on the stem, a plurality of grab hooks pivoted at their upper ends to the sleeve, a runner slidably mounted on the stem, a plurality of links pivotally connecting the runner and the upper portions of the grab hooks, a spring engaging the stop and connected with the runner to move said runner on the stem, a trigger pivoted to the stem and having a depending arm provided with a notch to engage one of the links, and a flexible member connected with the trigger and with one of the grab hooks and slidable through the stop.

4. In a trapping device, a stem provided with a stop on one end thereof, a sleeve secured on the stem, a plurality of grab hooks pivoted at their upper ends to the sleeve, a runner slidable on the stem, and a contractile spring mounted on the stem and connected with the runner and the stop, a plurality of links pivoted to the runner and the grab hooks, said stem being formed with a slot adjacent the sleeve, a trigger pivoted in said slot and provided with a depending arm having a notch to engage one of the links, a flexible member connected with the trigger and provided with a bait hook on one end thereof, a second flexible member connected with the trigger and movable through the stop and one of the grab hooks and provided with a bait hook on its lower end.

In testimony whereof I affix my signature in presence of two witnesses.

GEORGE M. RAINS.

Witnesses:
 JOHN MACKEY,
 WM. POWERS.

---

Copies of this patent may be obtained for five cents each, by addressing the "Commissioner of Patents, Washington, D. C."